United States Patent [19]

Rose

[11] Patent Number: 5,197,345
[45] Date of Patent: Mar. 30, 1993

[54] TAPER BUSHED SCREW CONVEYOR DRIVE AND METHOD WITH DEMOUNT FEATURE

[75] Inventor: Max H. Rose, Greenville, S.C.

[73] Assignee: Reliance Electric Industrial Company, Greenville, S.C.

[21] Appl. No.: 792,431

[22] Filed: Nov. 15, 1991

[51] Int. Cl.⁵ .................... F16H 1/20; F16D 1/06; B23P 19/06
[52] U.S. Cl. .................... 74/421 R; 29/256; 29/525; 403/16; 403/258; 403/370; 403/371
[58] Field of Search .............. 74/421 R, 421 A; 29/256, 525; 403/16, 258, 370, 371

[56] References Cited

U.S. PATENT DOCUMENTS

| | | | |
|---|---|---|---|
| 3,590,652 | 7/1971 | Strang | 74/421 |
| 4,034,837 | 7/1977 | Vinarcsik et al. | 29/256 X |
| 4,095,908 | 6/1978 | Schafer et al. | 403/16 |
| 4,452,547 | 6/1984 | Thiel et al. | 403/370 |
| 4,471,846 | 9/1984 | Mullenberg | 403/16 |

*Primary Examiner*—Allan D. Herrmann
*Attorney, Agent, or Firm*—Dority & Manning

[57] ABSTRACT

Speed reducer, such as a screw conveyor drive, adapted to receive a shaft within a tapered sleeve. The shaft includes a tapered portion adapted for engagement with the corresponding tapered portion of the sleeve on one side of the housing when the shaft is inserted into the bore. On the other side of the housing, a split bushing is provided for receipt within the sleeve, the split bushing including a tapered surface for mating engagement with the tapered surface on the sleeve. A retainer plate is provided that is adapted to be placed on the end of the shaft extending through the bore. The retainer plate has a center hole for receipt of a capscrew through the retainer plate and into the shaft to securely maintain the shaft in place. The retainer plate further has a plurality of holes dimensioned so that the head and shank of screws may extend therethrough and a plurality of holes dimensioned so that only the shank of the screws can extend therethrough. To demount the shaft, the retainer plate and bushing are removed, the retainer plate replaced, and the capscrews inserted through the smaller plurality of plate holes and rotated, which causes the plate to force the shaft out of the bore.

14 Claims, 2 Drawing Sheets

TAPER BUSHED SCREW CONVEYOR DRIVE AND METHOD WITH DEMOUNT FEATURE

BACKGROUND OF THE INVENTION

The present invention relates generally to shaft mountings for gearboxes and the like, and more particularly to a novel mounting and demounting system and related method for a speed reducer or screw conveyor drive.

The present invention is embodied herein as a speed reducer or the like that is mounted on and supported by the end of a driven shaft, particularly for use as a screw conveyor drive. Screw conveyors or augers are used extensively in the grain handling industry to move grain from one location to another. The screw conveyor drive functions to reduce speed, multiply torque, and drive the screw or auger. It also functions to accept the thrust load imposed as the grain or material is being pushed along a trough by the auger. Screw conveyors are also used to move aggregates, chemicals, food, minerals, wood products, waste products and other materials.

A number of different securing mechanisms have been used in the past to secure speed reducers to a shaft to be driven. Often, the output shaft extends through a bore in the reducer and is secured in the reducer by one or more set screws. Because of the required space between the shaft and the bore in this type arrangement, the shaft cannot be mounted flush in the bore, and the shaft tends to rotate non-concentrically (also referred to as "orbiting") and excessive wear and/or premature shaft fatigue may be generated. In another arrangement, as illustrated in U.S. Pat. No. 3,590,652, whose disclosure is hereby incorporated by reference, twin tapered bushings have been utilized to receive and secure a shaft in a speed reducer. This arrangement eliminates many of the problems inherent in the above-discussed system for mounting a shaft within a speed reducer. While such arrangement is effective for its intended purposes, it does utilize multiple bushings It also does not provide a system for demounting the shaft from the reducer, nor is the twin tapered bushing system as effective in transmitting the thrust load created in a screw conveyor.

SUMMARY OF THE INVENTION

The present invention recognizes and addresses the foregoing disadvantages, and others, of prior art mounting systems for speed reducers.

Accordingly, it is an object of the present invention to provide an improved mounting system for a speed reducer.

It is another object of the present invention to provide a mounting system for a speed reducer that prevents orbiting of the shaft within the reducer hub and therefore minimizes wear and premature shaft fatigue.

It is a further object of the present invention to provide a system and related method for demounting a shaft from a speed reducer.

It is another object of the present invention to provide a system for mounting a shaft within a speed reducer that effectively transmits forces introduced therein during operation and prevents misalignment between the reducer and the shaft.

It is a further object of the present invention to provide a system for mounting a shaft in a hub that provides an effective engagement between the shaft and hub and is adaptable to a variety of different types of drives and drive elements.

These and other objects are achieved by various exemplary embodiments as described herein. One such embodiment relates to an improved speed reducer with a housing that includes an input means and output means, the input and output means being operatively connected by gears within the housing The output means includes a sleeve defining a bore in the housing for receiving a portion of an output shaft therein, the sleeve having a first side and a second side, and comprising a substantially cylindrically shaped central portion and tapered ends formed by outwardly flaring inner walls. The output means is adapted to receive a shaft within the sleeve from the second side of the housing, with a portion of the shaft extending through the sleeve to the first side of the housing, the shaft including a tapered portion adapted for engagement with the corresponding tapered portion of the sleeve on the second side of the housing when the shaft is inserted into the bore. The output means further comprises a split bushing for receipt within the sleeve at the first side of the housing, the split bushing including a substantially cylindrical inner surface for receipt on the shaft and a tapered outer surface for mating engagement with the tapered surface on the first side of the sleeve. The speed reducer further includes means for maintaining the bushing in place on the shaft, so that the shaft will be securely maintained in the speed reducer by the sleeve and bushing.

In one preferred exemplary embodiment, the bushing includes a radially outwardly extending flange that defines a plurality of holes therein. The sleeve also includes a ring on the first end and means for maintaining the ring on the sleeve, the ring defining a plurality of threaded holes therein corresponding to the holes defined in the flange. Screw means extend through the flange holes and into the ring for urging the tapered portion of the bushing into engagement with the sleeve and urging the bushing into engagement with the shaft. The screw means includes a shank portion and a head portion, and the retainer plate defines a plurality of first holes dimensioned to receive the shank and head portions of the screw means and a plurality of second holes dimensioned to receive only the shank portion of the screw means so that the screw means can be inserted into the first holes and extend through the flange holes in the bushing and threadingly engage the holes in the ring for securing the bushing in place, and further wherein the bushing can be removed and the screw means inserted into the second set of holes and into the holes in the ring so that the retainer plate will contact a portion of the shaft and force the shaft out of the bore when the screw means are rotated.

It is also preferred that the retainer plate define a center hole therethrough for receipt of a retainer capscrew which extends into the shaft to maintain the retainer plate in place.

These and other objects are also accomplished by providing a method of demounting a shaft from a speed reducer comprising a sleeve defining a bore in the housing with a first and second end, and receiving a portion of a shaft in the bore from the second side, the shaft terminating on the first side, the method comprising the step of providing a ring on the sleeve, the ring defining a plurality of threaded holes therein. The method also includes the step of providing a tapered bushing in mating engagement with the first end of the sleeve, the bushing including a radially outwardly extending flange defining therein a plurality of holes. The method further includes providing screw means extending through the flange holes of the bushing and into the ring for urging the tapered portion of the bushing into engagement with the sleeve and urging the bushing into engagement with the shaft. The method includes the further step of providing a retainer plate, the retainer plate defining a plurality of first holes dimensioned to receive the shank and head portions of the screw means when the bushing is in place, and a plurality of second holes dimensioned to receive only the shank portion of the screw means, and a center hole receiving a center capscrew therethrough extending into the shaft. The method includes the further steps of removing the center capscrew and removing the retainer plate, removing the screw means from the bushing and ring, and removing the bushing. The method further includes remounting the retainer plate by inserting the screw means into the plurality of second holes in the retainer plate and into the corresponding holes on the ring, and rotating the screw means to bring the retainer plate into contact with the shaft and force the shaft out of the bore.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification including reference to the accompanying figures in which.

Figure 1:
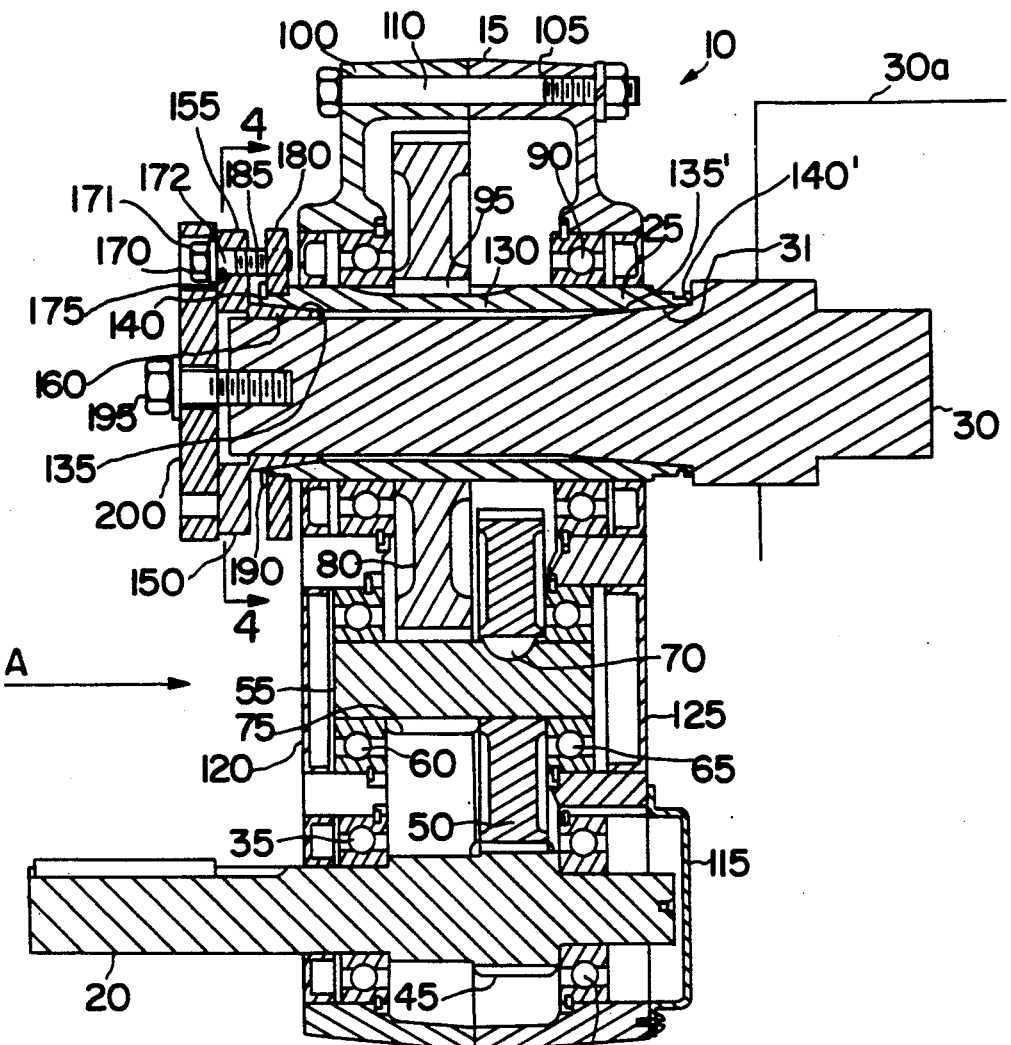
FIG. 1 is a sectional view of a speed reducer in accordance with the present invention.

Repeat use of reference characters in the present specification and drawings is intended to represent same or analogous features or elements of the invention.

DETAILED DESCRIPTION OF PREFERRED EMBODIMENTS

It is to be understood by those of ordinary skill in the art that the present discussion is a description of exemplary embodiments only, and is not intended as limiting the broader aspects of the present invention, which broader aspects are embodied in the exemplary constructions.

Referring to FIG. 1, a speed reducer in accordance with an embodiment of the present invention is illustrated generally at 10. The speed reducer includes a housing 15 and an input means. As embodied herein, the input means includes an input shaft 20 adapted to be connected to a suitable drive arrangement such as a pulley and V-belt drive arrangement and electric motor, for providing the input to the speed reducer 10. Speed reducer 10 also includes an output means. As embodied herein, the output means includes a sleeve 25 with a first side 26 and a second side 27 defining a bore within the housing. The reducer is adapted to receive an output shaft 30 within sleeve 25. As embodied herein, speed reducer 10 is adapted to be mounted on and supported by shaft 30. In an exemplary embodiment, shaft 30 may be the shaft of a screw conveyor as illustrated generally at 30a. Shaft 30 includes a tapered portion 31 adapted for mating engagement with the second side 27 of sleeve 25.

Input shaft 20 is supported for rotation in housing 15 by anti-friction bearings 35 and 40 and is operatively connected through a geartrain to sleeve 25. Connected to input shaft 20 is gear 45 which matingly engages gear 50. Gear 50 is supported on idle shaft 55 which is journaled on anti-friction bearings 60 and 65. Gear 50 is connected to idle shaft 55 by key 70. Gear 75 is also supported on idle shaft 55 and operatively engages gear 80. The hub of gear 80 is rigidly secured to sleeve 25 and is journaled in the housing on anti-friction bearings 85 and 90. Gear 85 is connected to sleeve 25 by key 95. Of course, any suitable geartrain connecting the input shaft to the output hub would be within the scope of the present invention.

In a preferred embodiment, housing 15 comprises a left-hand section 100 and right-hand section 105, secured together by bolts 110. To provide ready access to the various bearings and shafts described above, openings are provided in the housing that are covered by covers 115, 120 and 125, these covers being secured to the housing in any conventional manner.

Figure 3:
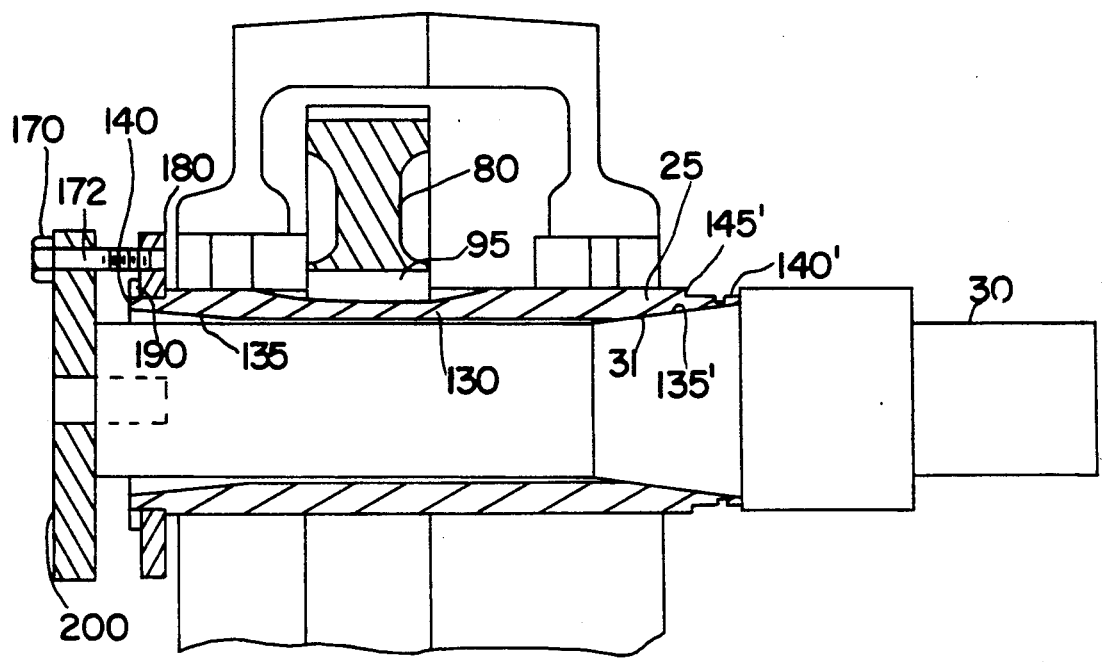
FIG. 3 is a sectional view of a reducer in accordance with the present invention with the bushing removed and in position to demount the shaft.
Figure 4:
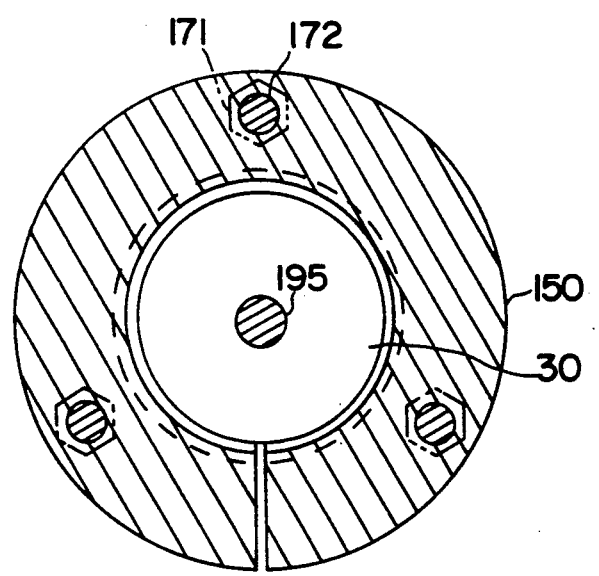
FIG. 4 is an end cross-sectional view of FIG. 1 taken along lines 4—4.

Referring to FIGS. 1 and 3, sleeve 25 includes a cylindrical center sidewall 130 and tapered ends formed by outwardly flaring inner walls 135, 135'. The outside ends of sleeve 25 include reduced diameter portions 140, 140', forming outwardly flaring shoulders 145, 145'.

Outwardly flaring inner wall 135' of sleeve 25 is adapted to matingly engage with tapered portion 31 of shaft 30 when shaft 30 is inserted into the bore formed by sleeve 25 and housing 15. As illustrated herein, first side refers to the left side in FIGS. 1 and 3 and second side refers to the right side in FIGS. 1 and 3. Referring to FIG. 1, on the first side of the bore, a split bushing 150 is received within said outwardly flaring inner wall 135 of sleeve 25. Split bushing 150 includes an outwardly extending flange 155 defining a plurality of holes 175 therein and an axially extending sleeve portion 160 with a tapered outer surface adapted to engage tapered surface 135 of sleeve 25. Split bushing 150 includes a slot or split that extends through the flange portion 155 and axially extending sleeve portion 160 of the bushing so that when assembled in its operative position, split bushing 150 can be compressed to provide a secure fit to shaft 30 by the interaction between tapered surfaces 160 and 135 causing the slot in the split bushing to close. Holes 175 in bushing flange 155 are larger than screw shank portions 172 to permit bushing 150 to contract without any interference from the screw means when the screws are tightened during the assembly operation and the tapered surfaces are forced together by inward movement of the bushing into the sleeve (in the direction of arrow A in FIG. 1).

Seated on the outer periphery of sleeve 25 at its first side is a tap ring 180. Tap ring 180 includes a plurality of threaded holes 185 extending therethrough and is maintained in place by a snap ring 190 and shoulder 145. The holes in tap ring 180 are adapted for alignment with holes 175 in the outwardly extending flange 155 of bushing 150.

Figure 2:
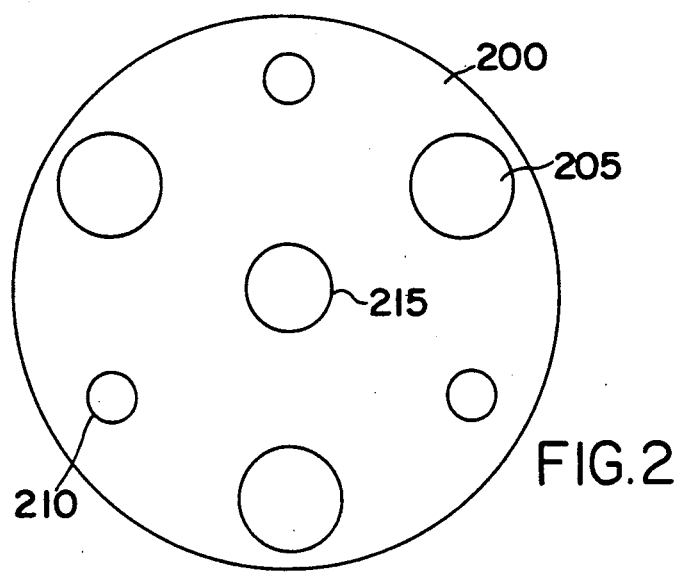
FIG. 2 is a front view of a retainer plate in accordance with the present invention.

Screw means are provided to secure bushing 150 in place. As embodied herein, the screw means include capscrews 170 with head portions 171 and shank or shaft portions 172. As illustrated in FIGS. 1 and 2, a retainer plate 200 includes a plurality of first holes 205 and a plurality of second holes 210. First holes 205 are dimensioned so as to receive both the head portions and shank portions of capscrews 170. Second holes 210 are dimensioned so as to receive only the shank portions 172 of capscrews 170. In a preferred embodiment, first holes may be ⅜ inch in diameter and second holes may be ¼ inch in diameter.

Retainer plate 200 also includes center hole 215 which is adapted to receive shaft capscrew 195 which extends through retainer plate 200 and threadingly engages shaft 30 in its center. Shaft capscrew 195 is adapted to maintain retainer plate 200 in place. Retainer plate 200 and shaft capscrew 195 provide the function of transmitting through the hub the thrust force that is generated by the screw or auger in a direction that would tend to pull the shaft out of the hub (i.e., thrust load from left to right and in the direction of arrow A in FIG. 1).

In its operative position as illustrated in FIG. 1, the screw means extend through first holes 205 in retainer plate 200, through flange holes 175 in bushing 150 and threadingly engage holes 185 in tap ring 180. The screw means may be rotated to axially urge bushing 150 into mating engagement with sleeve 125 causing bushing 150 to secure itself to shaft 30 and sleeve 25 providing a tight fit preventing orbiting of shaft 30 in the bore of speed reducer 10. Shaft capscrew 195 extends through center hole 215 and into shaft 30 to secure the retainer plate 200 in place.

As best illustrated in FIG. 3, when it is desired to demount shaft 30 from the speed reducer, shaft capscrew 195 is removed which allows retainer plate 200 to be removed. Capscrews 170 are removed and bushing 150 is then removed. Bushing 150 may be removed by a jackscrew mechanism such as disclosed in U.S. Pat. No. 3,590,652, incorporated herein by reference. Retainer plate 200 is placed back onto the reducer with capscrews 170 inserted through second holes 210 to threadingly engage ring holes 185 in tap ring 180. Since second holes 210 are dimensioned so that only the shank portions 172 of capscrews 170 will extend therethrough, and bushing 150 has been removed, when capscrews 170 are rotated to tighten retainer plate 200, the face of the retainer plate will abut shaft 30 and force it out of the bore of speed reducer 15 (in the direction of arrow A), thereby demounting the shaft from the speed reducer.

It should be understood by one skilled in the art that, although embodied herein as a speed reducer, the present invention encompasses the disclosed mounting and demounting arrangement for any type shaft mounted where the principles of the present invention could be utilized.

Another preferred embodiment of the present invention is a method of demounting a shaft, such as 30, from a speed reducer, such as 10. As described above, speed reducer 10 comprises a sleeve 25 defining a bore in the housing with a first and second end, and receiving a portion of shaft 30 in the bore from the second side, the shaft terminating on the first side as illustrated in FIG. 1. The method comprises the step of providing a ring 180 on sleeve 25, the ring defining a plurality of threaded holes 185 therein. The method also includes the step of providing a tapered bushing 150 in mating engagement with a first end of 25, the bushing including a radially outwardly extending flange 155 defining therein a plurality of holes 175. The method further includes providing screw means extending through flange holes 175 into ring holes 185 for urging the tapered portion of the bushing into engagement with shaft 30. As embodied herein, the screw means includes capscrews 170.

The method includes the further step of providing a retainer plate 200, the retainer plate defining a plurality of first holes 205 dimensioned to receive the shank 172 and head 171 portions of the screw means when the bushing 150 is in place, and a plurality of second holes 210 dimensioned to receive only the shank portions 172 of the screw means, and a center hole receiving a center capscrew therethrough extending into said shaft. The method includes the further step of removing said center capscrew and removing said retainer plate from the bushing and ring, and removing the screw means from the bushing and ring and removing the bushing, and remounting the retainer plate by inserting the screw means into the plurality of second holes 210 and rotating the screw means to bring plate 200 into contact with shaft 30 and force shaft 30 out of the bore. The method includes the further step of providing a shaft 30 with a tapered portion 31 to matingly engage a portion of sleeve 25.

These and other modifications and variations of the present invention may be practiced by those of ordinary skill in the art, without departing from the spirit and scope of the present invention, which is more particularly set forth in the appended claims. It should be understood that the elements of the various embodiments are interchangeable both in whole and in part. Furthermore, those of ordinary skill in the art will appreciate that the foregoing description is by way of example only, and is not intended to be limitative of the invention so further described in such appended claims.

What is claimed is:

1. An improved speed reducer, said speed reducer comprising:

a housing including an input means and an output means, said input and output means being operatively connected by gears within said housing;

said output means including a sleeve defining a bore in said housing for receiving a portion of an output shaft therein, said sleeve having a first side and a second side, and comprising a substantially cylindrically shaped central portion and tapered end portions on said first side and said second side formed by outwardly flaring inner walls;

said output means being adapted to receive a shaft within said sleeve from said second side, with a portion of said shaft extending through said sleeve to said first side, said shaft including a tapered portion adapted for engagement with the corresponding tapered portion of said sleeve on said second side of said housing when said shaft is inserted into the bore;

said output means further comprising a split bushing for receipt within said sleeve at said first side of said sleeve, said split bushing including a substantially cylindrical inner surface for receipt on said shaft and tapered outer surface for mating engagement with the tapered end portion on the first side of said sleeve; and means for maintaining said bushing in place on said shaft, so that said shaft will be securely maintained in said speed reducer by said sleeve and bushing.

2. An improved speed reducer as in claim 1, wherein said bushing includes a radially outwardly extending flange, said flange defining a plurality of holes therein.

3. An improved speed reducer as in claim 2, wherein said sleeve includes a ring on said first side end portion and means for maintaining said ring on said sleeve, said ring defining a plurality of threaded holes therein corresponding to the holes defined in the flange, and screw means extending through the flange holes and into the ring for urging the tapered outer surface of said bushing into engagement with said sleeve and urging said bushing into engagement with said shaft.

4. An improved speed reducer as in claim 3, wherein said means for maintaining said ring on said sleeve includes a reduced diameter portion at the first side for receiving the ring.

5. An improved speed reducer as in claim 1, wherein said output means includes a retainer plate.

6. An improved speed reducer as in claim 4, wherein said output means includes a retainer plate.

7. An improved speed reducer as in claim 6, wherein said screw means includes a shank portion and a head portion, sand said retainer plate defines a plurality of first holes dimensioned to receive the shank and head portions of the screw means and a plurality of second holes dimensioned to receive only the shank portion of the screw means so that the screw means can be inserted into said first holes and extend through said flange holes in said bushing and threadingly engage said holes in said ring for securing said bushing in place, and further wherein said bushing can be removed and said screw means inserted into said second set of holes and into said holes in said ring so that said retainer plate will contact a portion of said shaft and force said shaft out of said bore when said screw means are rotated.

8. An improved speed reducer as in claim 7, wherein said retainer plate defines a center hole therethrough for receipt of a retainer capscrew therethrough to maintain said retainer plate in place.

9. An improved speed reducer, said speed reducer comprising:
a housing including an input means and an output means, said input and output means being operatively connected by gears within said housing;
said output means including a sleeve defining a bore in said housing for receiving a portion of an output shaft therein, said sleeve having a first side and a second side, and comprising a substantially cylindrically shaped central portion and tapered end portions on said first side and said second side formed by outwardly flaring inner walls, said sleeve including a ring on said first side and means for maintaining the ring on said sleeve, said ring defining a plurality of threaded holes therein;
said output means being adapted to receive said output shaft within said sleeve from said second side, with a portion of said shaft extending through said sleeve to said first side of said sleeve;
said output means further comprising a split bushing for receipt within said sleeve at said first side of said housing, said split bushing including a substantially cylindrical inner surface for receipt on said shaft and a tapered outer surface for mating engagement with the tapered end portion on the first side of said sleeve, said bushing further including a radially outwardly extending flange defining therein a plurally of holes, said holes corresponding to the holes defined in the ring;

screw means extending through the flange holes and into holes defined int eh ring for urging the tapered portion of said bushing into engagement with said sleeve and urging said bushing into engagement with said shaft, said screw means including a shank portion and a head portion; and wherein said output means includes a retainer plate, said retainer plate defining a plurality of first holes dimensioned to receive the shank and head portions of the screw means and a plurality of second holes dimensioned to receive only the shank portions of the screw means so that the screw means can be inserted into said first holes and extend through said flange holes in said bushing and threadingly engage said holes in said ring for securing said bushing in place, and further wherein said bushing can be removed and said screw means inserted into said second set of holes in said retainer plate and into said holes in said ring so that the retainer plate will contact a portion of the shaft and force said shaft out of said bore when said screw means are rotated.

10. An improved speed reducer as in claim 9, wherein said means for maintaining said ring on said sleeve include a reduced diameter portion at the first side for receiving the ring.

11. An improved speed reducer as in claim 9, wherein said retainer plate defines a center hole therethrough for receipt of a retainer capscrew therein to maintain said retainer plate in place.

12. An improved speed reducer, said speed reducer comprising:
a housing including an input means and an output means, said input and output means being operatively connected by gears within said housing;
said output means including a sleeve defining a bore in said housing for receiving a portion of an output shaft therein, said sleeve having a first side and a second side, and comprising a substantially cylindrically shaped central portion and tapered ends formed by outwardly flaring inner walls, said sleeve including a ring on said first side and means for maintaining the ring on said sleeve, said ring defining a plurality of threaded holes therein;
said output means being adapted to receive a shaft within said sleeve from said second side of said sleeve, with a portion of said shaft extending through said sleeve to said first side, said shaft including a tapered portion adapted for engagement with the corresponding tapered portion of said sleeve on said second side of said housing when said shaft is inserted into the bore;
said output means further comprising a split bushing for receipt within said sleeve. at said first said of said housing, said split bushing including a substantially cylindrical inner surface for receipt on said shaft and a tapered outer surface for mating engagement with the tapered portion on the first side of said sleeve, said bushing further including a radially outwardly extending flange defining therein a plurality of flange holes, said flange holes corresponding to said threaded holes defined in said ring;
screw means extending through said flange holes and into the threaded holes of the ring for urging the tapered outer surface of said bushing into engagement with said sleeve and urging said bushing into engagement with said shaft, said screw means including a shank portion and a head portion; and wherein said output means includes a retainer plate at its first side, said retainer plate defining a plurality of first holes dimensioned to receive the shank and head portions of the screw means on the first side, and a plurality of second holes dimensioned to receive only the shank portions of the screw means on the first side, so that the screw means can be inserted into said first holes and extend through said flange holes in said bushing on said first side and threadingly engage said threaded holes in said ring for securing said bushing in place on said first side, and further wherein said bushing can be removed and said screw means inserted into said second set of holes defined in said retainer plate and into said threaded holes in said ring so that the retainer plate will contact a portion of the shaft and force said shaft out of said bore when said screw means are rotated.

13. A method of demounting a shaft from a speed reducer comprising a sleeve defining a bore in a housing with a first and second end, and receiving a portion of the shaft int eh bore from the second end, the shaft terminating on the firs end, said method comprising the steps of:

providing a ring on said sleeve, said ring defining a plurality of threaded holes therein;

providing a tapered bushing in mating engagement with said first end of said sleeve, said bushing including a radially outwardly extending flange defining therein a plurality of flange holes;

providing screw means extending through the flange holes of said bushing and into said ring holes for urging the tapered portion of said bushing into engagement with said sleeve and urging said bushing into engagement with said shaft;

providing a retainer plate, said retainer plate defining a plurality of first holes dimensioned to receive the shank and head portions of the screw means when said bushing is in place, a plurality of second holes dimensioned to receive only the shank portion of the screw means, and a center hole dimensioned to receive a center capscrew therethrough extending into said shaft;

removing said center capscrew and removing said retainer plate;

removing said screw means form said bushing and ring and removing said bushing; and inserting said screw means into said plurality of second holes in said retainer plate and remounting said retainer plate by inserting said screw means into the corresponding threaded holes on the ring, and rotating said screw means to force said retainer plate against the end of said shaft and force said shaft out of the bore.

14. The method of claim 13, and further including the step of providing a tapered shaft to matingly engage said sleeve.

* * * * *